(12) United States Patent
Yoon

(10) Patent No.: US 7,606,540 B2
(45) Date of Patent: Oct. 20, 2009

(54) APPARATUS AND METHOD FOR USING AMBIENT RF POWER IN A PORTABLE TERMINAL

(75) Inventor: Seong-Ho Yoon, Hwasung-si (KR)

(73) Assignee: Samsung Electronics Co., Ltd. (KR)

( * ) Notice: Subject to any disclaimer, the term of this patent is extended or adjusted under 35 U.S.C. 154(b) by 644 days.

(21) Appl. No.: 11/335,446

(22) Filed: Jan. 19, 2006

(65) Prior Publication Data
US 2006/0160517 A1 Jul. 20, 2006

(30) Foreign Application Priority Data
Jan. 19, 2005 (KR) .................. 10-2005-0004939

(51) Int. Cl.
*H04B 1/04* (2006.01)
(52) U.S. Cl. ................. 455/127.1; 455/128; 455/575.1; 455/562.1; 343/720

(58) Field of Classification Search .............. 455/127.1, 455/343.1, 344, 454, 128–129, 572–574, 455/575.1, 550.1, 127.5, 333, 343.5; 320/101, 320/124, 127; 343/720
See application file for complete search history.

(56) References Cited

U.S. PATENT DOCUMENTS

| 6,882,128 | B1 * | 4/2005 | Rahmel et al. | ............... 320/101 |
| 7,084,605 | B2 * | 8/2006 | Mickle et al. | ............... 320/101 |
| 7,440,780 | B2 * | 10/2008 | Mickle et al. | ............... 455/573 |

FOREIGN PATENT DOCUMENTS

KR 10-2004-0077228 9/2004

* cited by examiner

*Primary Examiner*—Tony T Nguyen
(74) *Attorney, Agent, or Firm*—The Farrell Law Firm, LLP

(57) ABSTRACT

An apparatus and method for using ambient RF power in a portable terminal are provided. In the charging apparatus, an antenna array receives RF signals left derelict in the air, a rectifier rectifies the RF signals to DC voltages, and a power storage stores the DC voltages as power.

9 Claims, 6 Drawing Sheets

APPARATUS AND METHOD FOR USING AMBIENT RF POWER IN A PORTABLE TERMINAL

PRIORITY

This application claims priority under 35 U.S.C. § 119 to an application entitled "Apparatus And Method For Charging Derelict RF Power In A Portable Terminal" filed in the Korean Intellectual Property Office on Jan. 19, 2005 and assigned Serial No. 2005-4939, the contents of which are incorporated herein by reference.

BACKGROUND OF THE INVENTION

1. Field of the Invention

The present invention relates generally to a power charging apparatus and method in a portable terminal, and in particular, to an apparatus and method for using ambient radio frequency (RF) power to charge a battery.

2. Description of the Related Art

Since the initial debut of the cellular concept at Bell Labs in 1947 and the debut of the first-generation (1G) commercial cellular system in Japan in 1979, mobile communication technology has developed toward portable Internet, digital multimedia broadcasting (DMB), and ubiquitous network service, with the migrations from 1G to second generation (2G) and 2G to third generation (3G). People are under exposure to electronic waves and active studies are being conducted to investigate whether electronic waves are harmful to the human body.

The growth of digital convergence has driven portable terminals to offer a variety of functions, which in turn increase power consumption. Moreover, the development of high-speed multimedia mobile communication service further increases the power consumption of the portable terminals including cellular phones and laptop computers. Accordingly, a low-power integrated circuit (IC) and a large-capacity battery are high priorities in the future developmental phase, and the ultimate goal will be development of a charge-free terminal.

With the aim of active provisioning of high-speed mobile communication service, cell radius has recently been decreased enough to cause the appearance of a nano cell and a pico cell. In addition, the use of many service bands is increasing exposure to electronic waves. In this context, a need exists for techniques of actively utilizing ambient RF or micro-wave power.

SUMMARY OF THE INVENTION

An object of the present invention is to substantially solve at least the above problems and/or disadvantages and to provide at least the advantages below. Accordingly, an object of the present invention is to provide an apparatus and method for using ambient RF power to charge a storage device after direct current (DC) conversion in a portable terminal.

The above and other objects are achieved by providing an apparatus and method for using ambient RF power in a portable terminal.

According to one aspect of the present invention, in an apparatus and method for using ambient RF power in a portable terminal, an antenna array receives random RF signals left derelict in the air, a rectifier rectifies the RF signals to DC voltages, and a power storage device stores the DC voltages as power.

It is preferred that the antenna array includes a plurality of narrow-band antennas for receiving signals at channel frequencies in a communications frequency band and signals at frequencies adjacent to the communications frequency band, and a plurality of broad-band antennas for receiving signals at frequencies far from the communications frequency band.

It is preferred that the apparatus further includes a plurality of harmonic frequencies generated from an active device, and a second rectifier for rectifying the harmonic frequencies to DC voltages to be stored as power in the power storage device.

It is preferred that the antenna array includes an antenna for receiving a signal at a predetermined frequency chosen for a wireless power supply in a household.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention is intended to provide a method of converting ambient RF waves to DC power and charging a portable terminal with the DC power. The portable terminal can be any of portable devices requiring power charging (or battery charging), such as a portable communication device, an MP3 player, a laptop computer, and a remoter controller. The following description is made in the context of a portable communication terminal.

Figure 1:
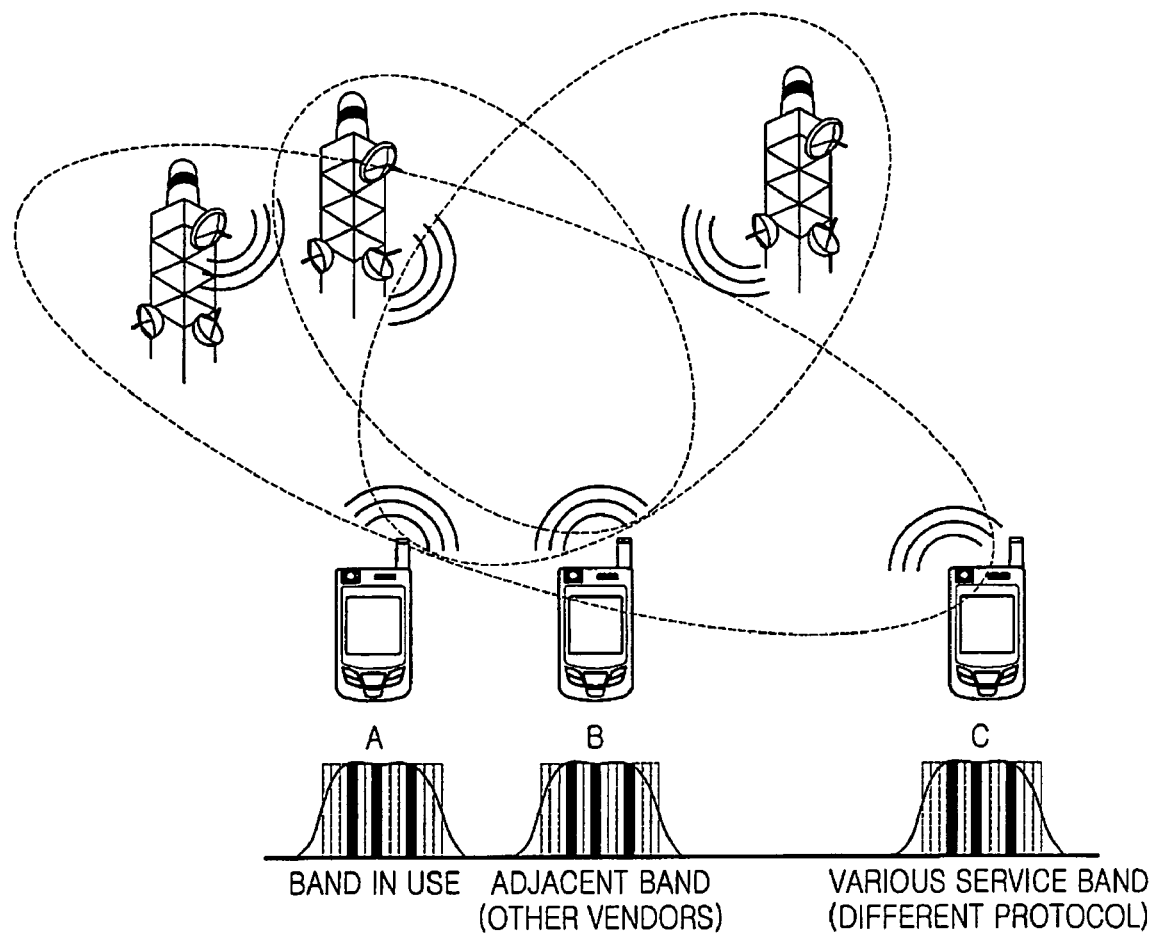
FIG. 1 illustrates an example of ambient power often encountered in everyday living.

FIG. 1 illustrates an example of ambient power often encountered in everyday living.

Referring to FIG. 1, user A is exposed to ambient power at different frequencies including adjacent frequencies of other vendors using the same protocol as that of user A (frequency from user B) and frequencies using a different protocol (frequency from user C). The present invention is characterized in that the ambient RF power is collected and stored in a power storing circuit of a portable terminal using an antenna tuned to those frequencies.

Figure 2:
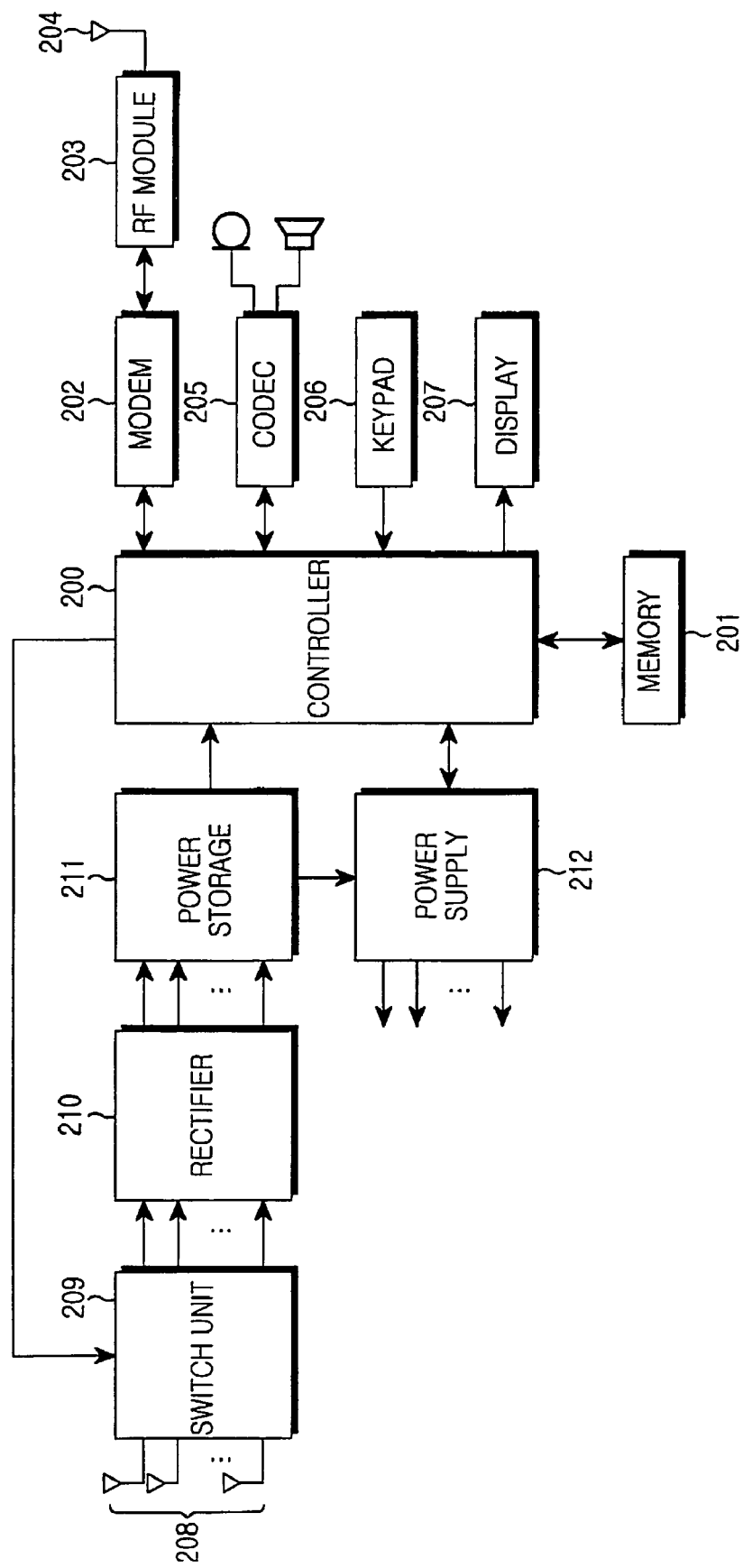
FIG. 2 is a block diagram of a portable terminal according to an embodiment of the present invention.

FIG. 2 is a block diagram of a portable terminal according to an embodiment of the present invention. The portable terminal can be a cellular phone, a personal communication system (PCS), a personal data assistant (PDA), an international mobile telecommunications-2000 (IMT-2000) phone, or an orthogonal frequency division multiplexing (OFDM) terminal. Components common to the above terminals will be described below.

Referring to FIG. 2, a controller 200 provides overall control to the portable terminal. For example, it processes and controls voice calls and data communications. Besides the basic functionality, the controller 200 controls the integration of RF power received through an antenna array 208 in a power storage 211 according to the present invention. The typical processing and control operation of the controller 200 for basic functionality will not be provided herein.

A memory 201 includes a program memory, a data memory, and a non-volatile memory. The program memory stores programs for controlling the entire operation of the portable terminal. The program memory can be a flash memory. The data memory temporarily stores data generated during the operation of the portable terminal. It can be a random access memory (RAM). The non-volatile memory stores system parameters and other data (e.g. phone numbers and SMS messages). The non-volatile memory can be an electrically erasable programmable read only memory (EEPROM).

A keypad 206 includes digit keys 0 to 9, a Menu key, a Clear key, an OK key, a Talk key, an End key, an Internet key, and navigation keys (up/down/left/right), etc. The keypad 206 provides to the controller 200 key input data corresponding to a key pressed by a user. A display 207 displays state information (or indicators) generated during the operation of the portable terminal, limited digits and characters, moving pictures, and still images. A liquid crystal display (LCD) can be used as the display 207.

An audio coder-decoder (CODEC) 205 connected to the controller 200 and a speaker and a microphone connected to the audio CODEC 205 form a voice input/output block used for voice communications. The audio CODEC 205 converts pulse code modulation (PCM) data received from the controller 200 to an analog voice signal and outputs the analog voice signal through the speaker. Also, it converts a voice signal received through the microphone to PCM data and provides the PCM data to the controller 200.

An RF module 203 downconverts an RF signal received through an antenna 204 to a baseband signal and provides the baseband signal to a MODEM 202. It also upconverts a baseband signal received from the MODEM 202 to an RF signal and transmits the RF signal through the antenna 204. The MODEM 202 processes a baseband signal transmitted/received between the RF module 203 and the controller 200. According to a predetermined wireless connection protocol, the MODEM 202 channel-encodes and spreads data, for transmission, and despreads and channel-decodes data, for reception.

The antenna array 208 of the present invention is used to receive ambient frequency signals. The antenna array 208 and the antenna 204 can be incorporated into a single antenna device, or configured as different antenna devices. In the antenna array 208 is preferably narrow-band antennas with a high quality factor (Q) used to receive signals with frequency allocations (FAs) within the frequency band of the portable terminal and frequencies adjacent to the use frequency of the portable terminal, and broad-band antennas are used to receive frequency bands apart from the use frequency, in order to prevent the broad-band antennas that do not have steep skirt characteristics from causing in-band interference to the use frequency.

The miniaturization and performance improvement of the antenna array is significant to the implementation of the present invention. The narrow-band antennas can improve the skirt characteristics of a frequency band as well as help in the miniaturization by adjusting current paths and utilizing coupling. Use of a substrate having a high dielectric constant can further shrink the antenna array 208 in size. The recent development of antenna design technology has enabled the appearance of a multi-band antenna like double, triple, quad, etc. The present invention can be implemented using this multi-band antenna.

A switch unit 209 switches on/off the narrow-band antennas of the antenna array 208 under the control of the controller 200. It is assumed herein that the broad-band antennas are kept on because they do not interfere with the use frequency.

A rectifier 210 rectifies a plurality of RF signals received through the antenna array 208 into DC voltages. The rectifier 210 can be configured by use of a diode or a resistance-capacitance (RC) filter, and herein is assumed to be configured by known technology. The power storage 211 stores the DC voltages therein. The stored power is provided to a power supply 212 to be used as an operation power to the portable terminal.

The power supply 212 reduces the voltages from the power storage 211 and a battery (not shown) to an appropriate level and provides the voltage to the components of the portable terminal. It also blocks power supply from the portable terminal.

The antenna array 208 and the rectifier 210 can be collectively formed as a rectifying antenna or "rectenna". Now a detailed description will be made of the components characteristic to the present invention, the antenna array 208, the switch unit 209, the rectifier 210, and the power storage 211.

Figure 3:
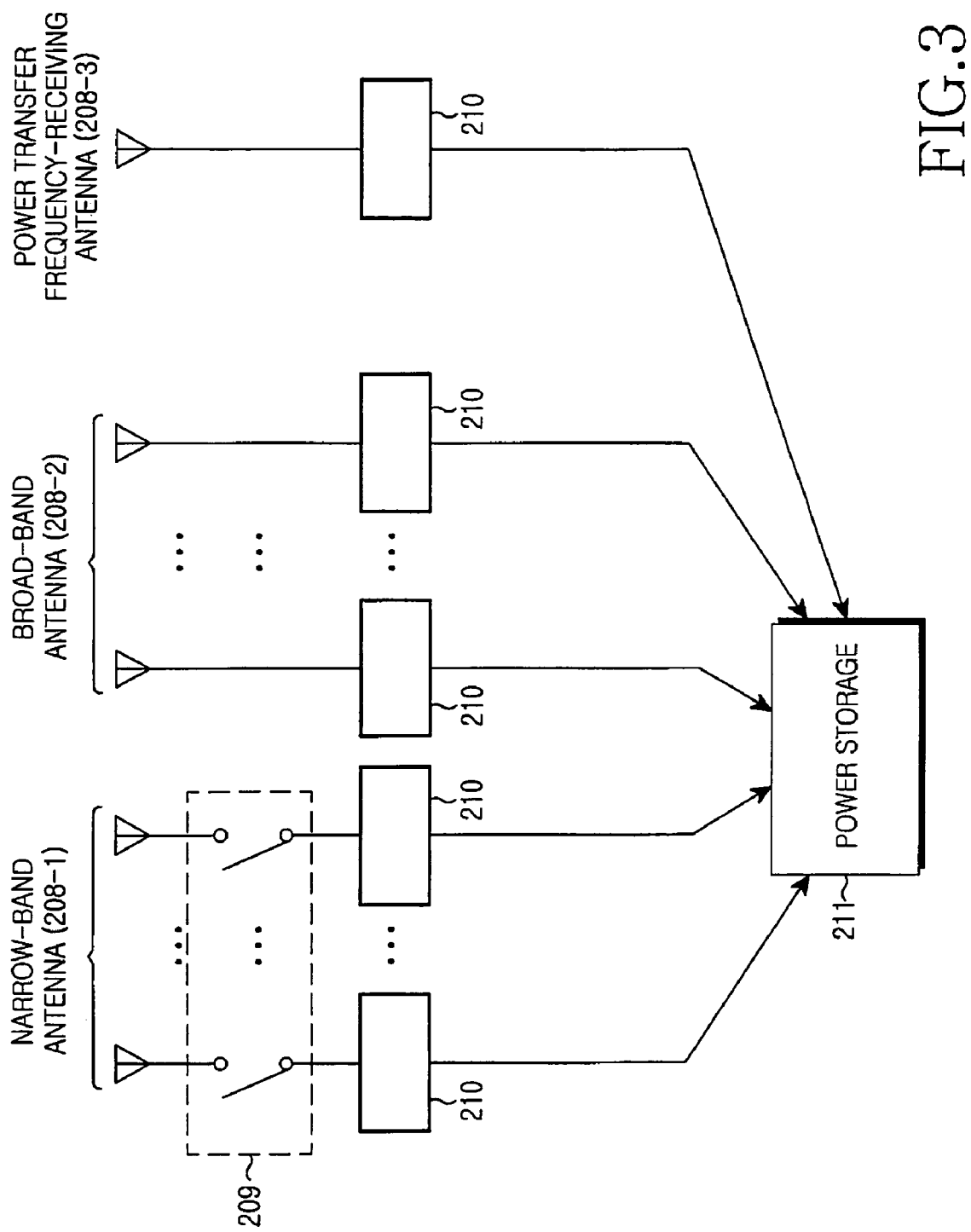
FIG. 3 illustrates a connection relationship among an antenna array, a switch, a rectifier, and a power storage illustrated in FIG. 2.

FIG. 3 illustrates a connection relationship among the antenna array 208, the switch unit 209, the rectifier 210, and the power storage 211.

Referring to FIG. 3, the antenna array 208 is divided into narrow-band antennas 208-1, broad-band antennas 208-2, and a predetermined frequency-receiving antenna 208-3. The narrow-band antennas 208-1 includes antennas for receiving signals with FAs within the use frequency band and antennas for receiving signals at frequencies adjacent to the use frequency band. The broad-band antennas 208-2 are used to receive signals in frequency bands far from the use frequency. The predetermined frequency-receiving antenna 208-3 receives a signal at a predetermined frequency for delivering wireless power. Use of the wireless power transferring frequency will be described later in great detail with reference to FIG. 5.

Switches in the switch unit 209 are provided between the narrow-band antennas 208-1 and the rectifier 210, for switching on/off the individual narrow-band antennas 208-1. When the portable terminal is powered on, the switches are all turned off, thereby deactivating the narrow-band antennas 208-1. If an FA for communication is then determined, the other narrow-band antennas 208-1 than the one corresponding to the determined FA are activated. RF signals received through the other narrow-band antennas 208-1 are converted to DC power and stored in the power storage 211.

The broad-band antennas 208-2 and the predetermined frequency-receiving antenna 208-3 are kept on all the time because they do not affect the use frequency at which the portable terminal communicates with a base station.

The rectifier 209 rectifies the RF signals received through the individual antennas to DC voltages using a rectifying device (e.g. diode). The power storage 211 stores power by integrating the DC voltages. The stored power is used as operation power to the portable terminal.

Figure 4:
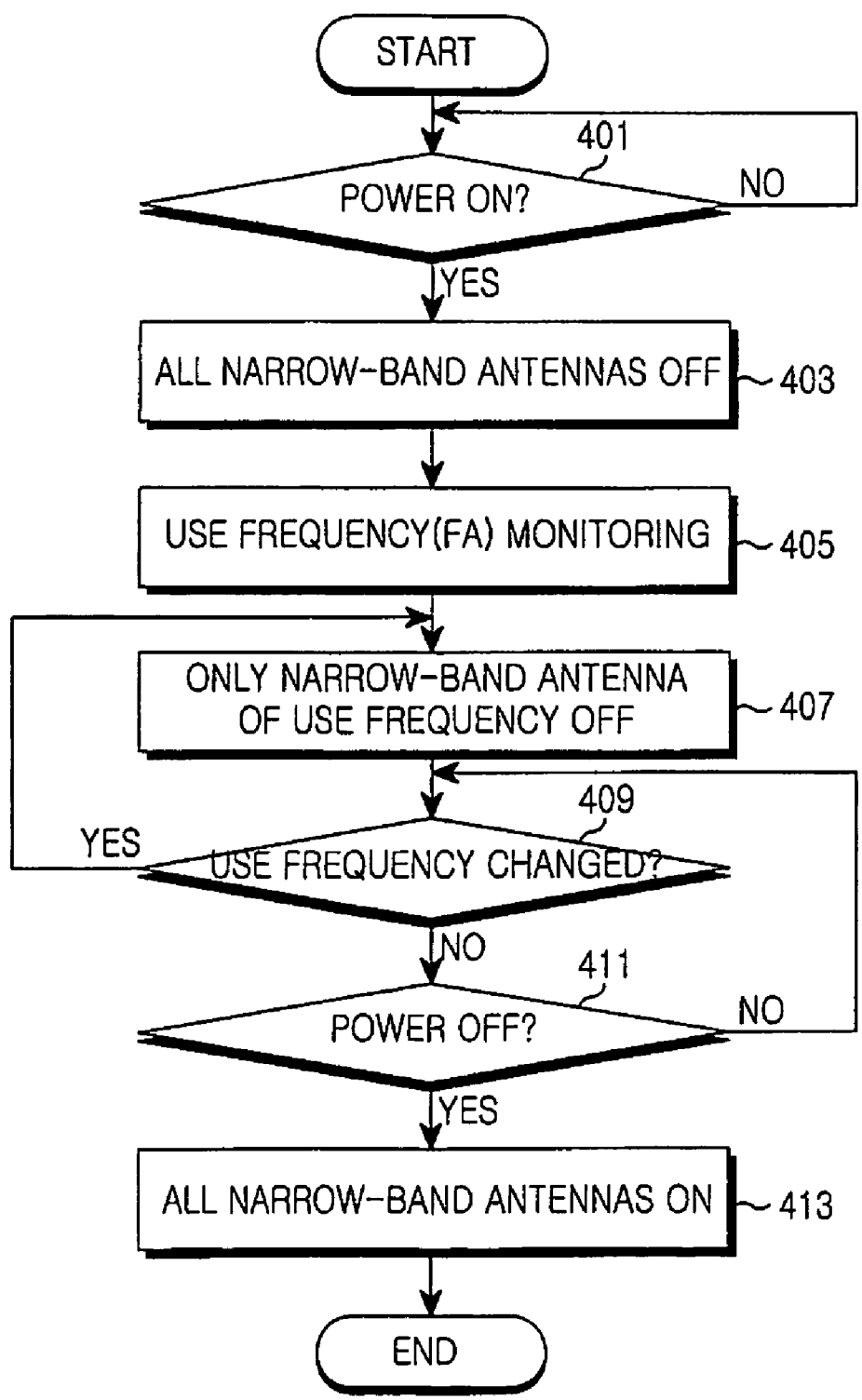
FIG. 4 is a flowchart illustrating an operation in the antenna array for receiving ambient RF power in the portable terminal according to an embodiment of the present invention.

FIG. 4. is a flowchart illustrating a control operation for receiving at the antenna array the ambient RF power in the portable terminal according to an embodiment of the present invention. The outlined procedure is directed to selectively activating the narrow-band antennas 208-1 in the case where the array antenna is configured as illustrated in FIG. 3.

Referring to FIG. 4, the controller 200 determines if power is on in step 401. Upon power-on, the controller 200 deactivates all the narrow-band antennas 208-1 in step 403 and determines an FA with which to communicate with the base station in step 405.

In step 407, the controller 200 activates the narrow-band antennas that do not correspond to the determined FA, receives ambient RF power through the activated narrow-band antennas, and stores the ambient RF power. At the same time, the controller 200 determines if the FA for communication has been changed in step 409. If the FA has been changed, the controller 200 returns to step 407 where it deactivates a narrow-band antenna corresponding to a new FA, activates the other narrow-band antennas, receives ambient RF power through the other narrow-band antennas, and stores the ambient RF power.

On the other hand, if the FA for communication is kept, the controller 200 determines if power is off in step 411. If power is still on, the controller 200 returns to step 409. Upon power-off, the controller 413 activates all the narrow-band antennas, receives ambient RF power through them, and stores the ambient RF power in step 413. Since the broad-band antennas 208-2 and the predetermined frequency-receiving antenna 208-3 are always on irrespective of the above-described algorithm, the portable terminal can receive and store ambient RF power all the time.

As stated before, power can be delivered using a predetermined frequency. The antenna 208-3 illustrated in FIG. 3 is for receiving signals at the predetermined frequency defined to transfer power. This frequency can be used to wirelessly transfer power to appliances within a household or a building.

Figure 5:
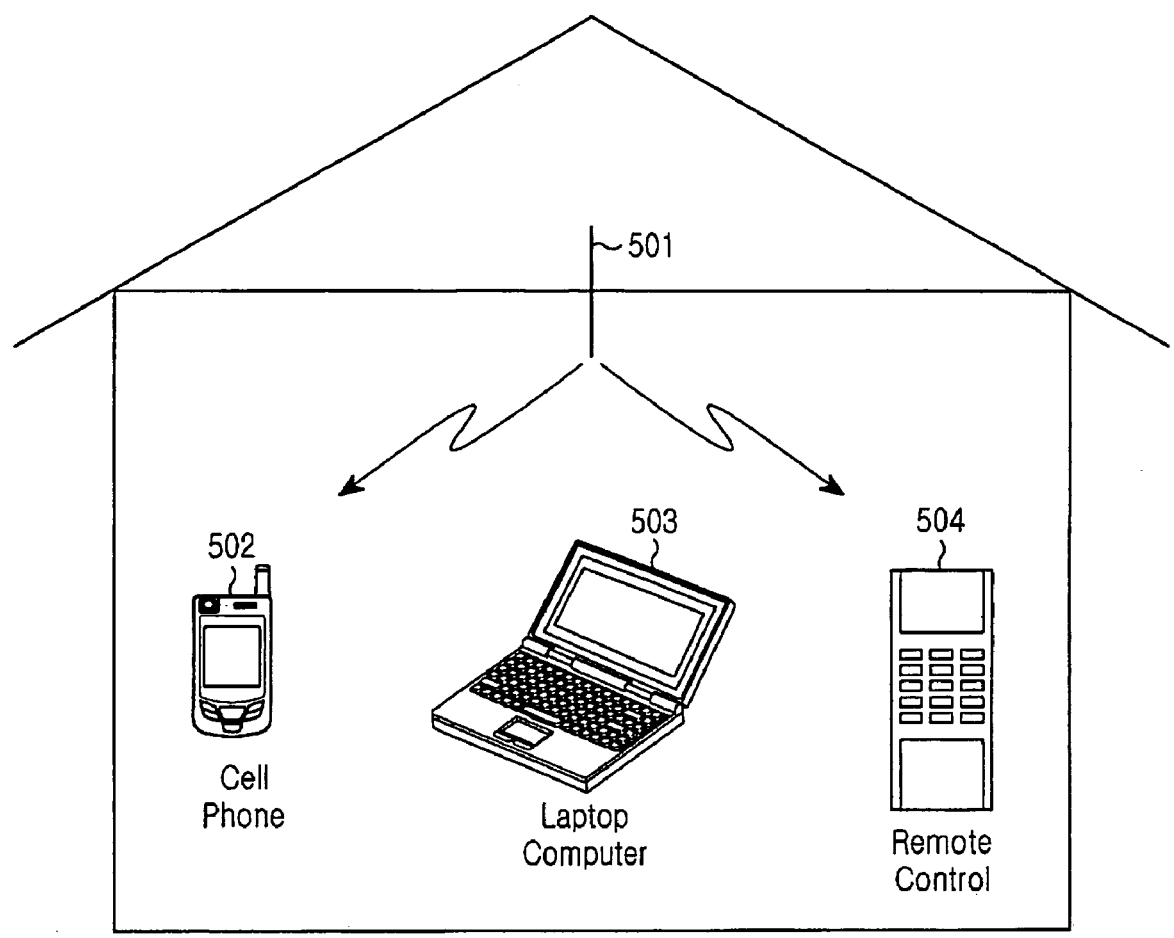
FIG. 5 illustrates an example of wireless power supply to appliances in a household according to the present invention.

FIG. 5 illustrates an example of wireless power supply to appliances in a household according to the present invention.

Referring to FIG. 5, power is wirelessly supplied to a plurality of terminals 502, 503 and 504 through a radio transmitter 501 instead of using a cable. The wireless power supply is carried out by decreasing a cell radius using frequency resources like industrial/scientific/medical (ISM) bands. The size of an antenna (or rectenna) can be decreased with a higher frequency. The harmful effects of electronic waves, which will continue to be a challenging issue to be tackled, are one of big problems in wireless power supply. To wirelessly transfer power with mitigated electronic waves within a household, a transmit antenna in the transmitter 501 is so configured as to have an adjustable narrow beam pattern as used in a smart antenna, to form an accurate beam in the direction of an intended terminal using a sensor, and to sense the distance between the terminal and the human body.

Figure 6:
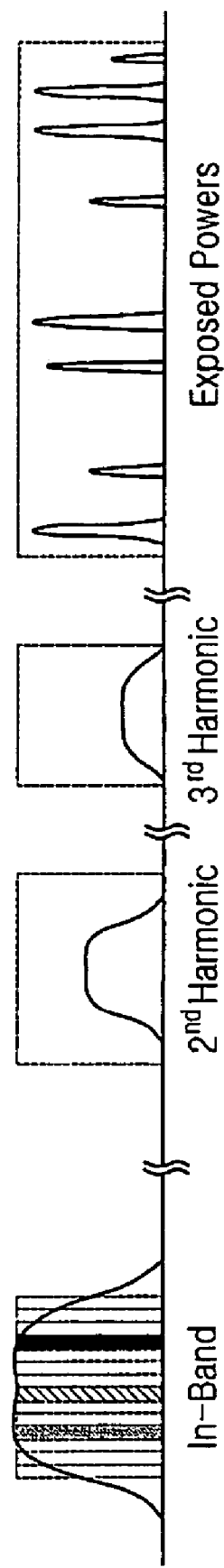
FIG. 6 illustrates an example of harmonic power emitted from an active device.

While the ambient RF power is stored in a terminal in the above-described embodiment, it can be further contemplated as another embodiment that harmonic power generated due to the characteristics of an active device within a terminal is converted to DC power and stored. Referring to FIG. 6, as a signal passes through an active device like an amplifier, a plurality of harmonic frequencies (harmonic power) are produced. Typically, a filter is provided at the rear end of the active device in the terminal to eliminate those harmonic frequencies. The present invention can be applied so that a filter is provided to extract harmonic frequencies, and the harmonic frequencies are converted to DC power and stored in the power storage 211.

As described above, the present invention advantageously prolongs battery life, which becomes a huge consideration due to enhanced multimedia functions, and ultimately enables realization of a charge-free terminal. Also, wireless power transfer to terminals within a household eliminates the inconvenience of charging them one by one. Application of the present invention to a low-power IC like a radio frequency identification (RFID) can lead to semi-permanent use.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for using ambient radio frequency (RF) power in a portable terminal, the apparatus comprising:
    a plurality of rectifiers for rectifying the RF signals to direct current (DC) voltage;
    a power storage device for storing the DC voltages from the rectifiers as power; and
    an antenna array having a plurality of narrow-band antennas, each of the narrow-band antennas being coupled to one of the rectifiers, for receiving signals at channel frequencies in a communications use frequency band and signals frequencies adjacent to the communications use frequency band,
    wherein, when the portable terminal is powered off, all of the narrow-band antennas are activated, and, during communications, a narrow-band antenna corresponding to a channel frequency in use is deactivated and the other narrow-band antennas are activated.

2. the apparatus claim 1, wherein the antenna array further comprises:
    a plurality of broad-band antennas for receiving signals at frequencies far from the use frequency band.

3. The apparatus of claim 2, the broad-band antennas are always kept on.

4. The apparatus of claim 1, further comprising a plurality of switches between the narrow-band antennas and the rectifiers, for selectively activating the narrow-band antennas.

5. The apparatus of claim 1, wherein each of the rectifiers rectify RF signals using one of a diode and a resistance-capacitance (RC) filter.

6. The apparatus of claim 1, further comprising an antenna for receiving a signal at a frequency set for wireless power supply to a household.

7. A method of using ambient radio frequency (RF) power in a portable terminal, the method comprising:
    determining whether the portable terminal is in communication;
    deactivating a narrow-band antenna corresponding to a channel frequency in use and activating other narrow-band antennas during communications;
    receiving ambient RF signals through the activated narrow-band antennas;
    rectifying the RF signals to direct current (DC) voltages using a plurality of rectifiers coupled to the narrow-band antenna; and
    storing the DC voltages as power from the rectifiers.

8. The method of claim 7, further comprising receiving a signal at a frequency set for wireless power supply to a household.

9. The method of claim 7, further comprising the step of activating all of the narrow-band antennas when the terminal is powered off.

* * * * *

UNITED STATES PATENT AND TRADEMARK OFFICE
CERTIFICATE OF CORRECTION

PATENT NO. : 7,606,540 B2  Page 1 of 1
APPLICATION NO. : 11/335446
DATED : October 20, 2009
INVENTOR(S) : Seong-Ho Yoon It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 918 days.

Signed and Sealed this

Twelfth Day of October, 2010

David J. Kappos
*Director of the United States Patent and Trademark Office*